United States Patent [19]

Bartelink

[11] 3,891,802

[45] June 24, 1975

[54] APPARATUS AND METHOD FOR AUGMENTING A TELEPHONE NETWORK

[75] Inventor: Everhard H. B. Bartelink, Concord, N.H.

[73] Assignee: Northeast Electronics Corporation, Concord, N.H.

[22] Filed: Jan. 15, 1971

[21] Appl. No.: 106,711

Related U.S. Application Data

[63] Continuation-in-part of Ser. No. 798,625, Feb. 12, 1969, abandoned.

[52] U.S. Cl. .............................. 179/2 A; 179/2 AS

[51] Int. Cl. .......................................... H04m 11/06

[58] Field of Search ........... 179/2 AS, 2 DP, 2 R, 5, 179/84 VF, 2 A; 325/31; 340/408, 413, 171 R

[56] References Cited

UNITED STATES PATENTS

| | | | |
|---|---|---|---|
| 2,726,377 | 12/1955 | Hammer | 179/2 R |
| 2,987,712 | 6/1961 | Polyzou | 340/413 |
| 3,058,065 | 10/1962 | Freeman | 325/31 |
| 3,070,798 | 12/1962 | Currey | 179/2 AS |
| 3,184,554 | 5/1965 | Meacham | 179/84 VF |
| 3,218,391 | 11/1965 | Hashimoto | 179/2 AS |
| 3,325,598 | 6/1967 | O'Neill | 340/408 |
| 3,357,009 | 12/1967 | Rusnak | 340/171 R |
| 3,381,276 | 4/1968 | James | 179/2 DP |
| 3,383,467 | 5/1968 | New | 179/2 DP |
| 3,387,091 | 6/1968 | Deiker | 179/5 |
| 3,469,036 | 9/1969 | Meri | 179/84 L |
| 3,482,243 | 12/1969 | Buchsbaum | 340/408 |
| 3,483,327 | 12/1969 | Schwartz | 179/2 AS |

*Primary Examiner*—David L. Stewart
*Attorney, Agent, or Firm*—Raymond J. McElhannon, Esq.

[57] ABSTRACT

The existing equipment of a public telephone system is used for remote supervision of the premises of a subscriber by locating condition energized tone generators at the premises coupled to the subscriber circuit (phone line) and sampling the subscriber circuits in the central office periodically to detect the presence of the tone signals, identify the circuit on which the signals appear, and determine the condition represented by the particular signal. Various equipment is described for both central office and remote subscriber identification. Includes central office readout of public utility meters and pay television supervision and billing. Also includes tone generators conditioned at the premises and energized from the central office.

18 Claims, 9 Drawing Figures

INVENTOR.
EVERHARD H.B. BARTELINK
BY
Ward, McElhannon, Brooks & Fitzpatrick
ATTORNEYS INVENTOR.
EVERHARD H. B. BARTELINK
BY
Ward McElhannon Brooks & Fitzpatrick
ATTORNEYS INVENTOR.
EVERHARD H.B. BARTELINK
BY
Ward McElhannon Brooks & Fitzpatrick
ATTORNEYS

INVENTOR.
EVERHARD H.B. BARTELINK

BY

Ward, McElhannon, Brooks & Fitzpatrick
ATTORNEYS

INVENTOR.
EVERHARD H.B. BARTELINK
BY
Ward, McElhannon, Brooks & Fitzpatrick
ATTORNEYS

APPARATUS AND METHOD FOR AUGMENTING A TELEPHONE NETWORK

This application is a continuation-in-part of application Ser. No. 798,625, filed Feb. 12, 1969 and now abandoned.

The present invention relates to apparatus and a method for adding an independent signalling function to individual subscriber circuits in a multi-subscriber intercommunication network.

While not limited thereto, the invention is particularly applicable to the addition of supervisory communication functions to the existing circuits of a telephone utility. The public telephone utility provides a vast network of intercommunication circuits between individual subscribers and various central offices. The present invention provides means for utilizing these existing circuits for various auxiliary functions such as the protection of the subscriber's premises against emergency conditions such as fire, loss of heat or power, freezing, unauthorized entry, and the like. The invention also has utility in remote readout of power utility meters and in handling pay television supervision and billing.

In the system described hereinafter, use is made of the equipment which is already in existence in a telephone central office. In such an office, all the circuits to the individual subscribers are accessible in the form of either contacts on distribution frames, multiple appearances on the contact banks of connector switches or the equivalent points in other switching devices.

In accordance with one aspect of the invention, there is provided apparatus for adding the independent signalling function to individual subscriber circuits in a multi-subscriber intercommunication network wherein the subscriber circuits radiate from a central distribution point, the apparatus comprising signal generating means for applying to the subscriber circuit a supervisory signal, distinguishable from the normal intercommunication traffic, the generating means being locatable at each of the subscriber locations which are to be provided with the signalling function, scanning means for the central distribution point for sequentially and repetitively scanning the signals on each of the last mentioned subscriber circuits, and means coupled to the scanning means and responsive to the appearance of the distinguishable supervisory signal on a subscriber circuit for identifying the circuit on which the signal appears.

In accordance with another aspect of the invention, there is provided a method of utilizing the circuits of a telephone utility for supervising a plurality of auxiliary functions which comprises the steps of locating at the subscriber locations, generators of supervisory signals distinguishable from the normal traffic of the utility, activating a generator at a subscriber location upon the occurrence of a detectable event at such location and applying the signal therefrom to the subscriber circuit, at the central office repetitively scanning the subscriber circuits in sequence to detect the presence of such distinguishable supervisory signals on a circuit, and identifying the particular circuit on which such distinguishable signal appears.

The invention will be better understood after reading the following detailed description of certain presently preferred embodiments thereof with reference to the appended drawings in which.

The same reference numerals are used throughout the drawings to designate the same or similar parts.

Figure 1:
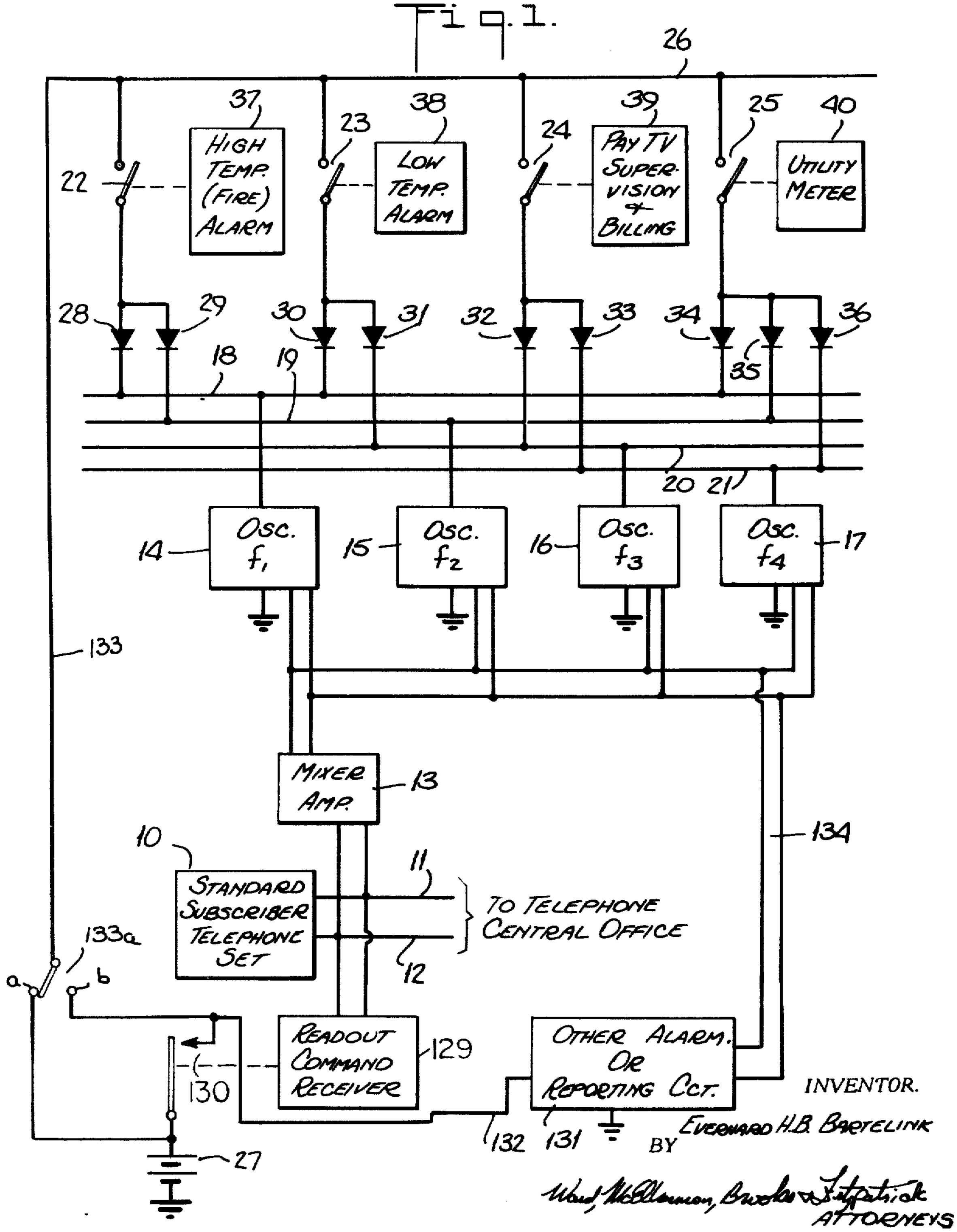
FIG. 1 is a simplified schematic diagram of one form of supervisory installation at a subscriber location.

Reference should now be had to FIG. 1. In order to explain the basic principles of the invention, one form of supervisory installation is shown in FIG. 1 for supervising both high and low temperature conditions as well as a pay television monitor and a utility meter monitor. A conventional or standard subscriber telephone set, designated by the reference numeral 10, is shown connected by the conductors 11 and 12 to a telephone central office. A mixer amplifier 13 is connected to the conductors 11 and 12 in parallel with the telephone set 10. While not shown, it is to be understood that the output of the mixer amplifier is decoupled from the conductors 11 and 12 by a capacitor or similar device for inhibiting the flow of direct current. Furthermore, the amplifier 13 should have a high output impedance to avoid unduly loading the subscriber circuit.

A plurality of supervisory signal generators 14, 15, 16 and 17 have their outputs coupled in parallel to the input to the mixer amplifier 13. In the simplest form, each of the supervisory generators 14, 15, 16 and 17 generates a discrete different frequency $f_1$, $f_2$, $f_3$ and $f_4$, respectively; it is, however, possible to use more complex signal generators. The frequencies should lie within the transmission band of the subscriber circuit. Each of the oscillators is provided with an independent connection to ground and a connection to a corresponding bus 18, 19, 20 and 21, respectively. The construction of each oscillator is such that it is activated to generate a signal of constant amplitude at the particular frequency when a voltage is applied between ground and its corresponding bus.

In order to energize the various buses 18, 19, 20 and 21, there is provided a series of normally open switches 22, 23, 24 and 25. One side of each of the switches is connected to lead 26 which is supplied with positive voltage from a battery 27, the negative terminal of which is connected to ground. The opposite end of switch 22 is connected through two diodes, 28 and 29 in parallel, to buses 18 and 19, respectively. The diodes 28 and 29 are poled with their anodes connected to the switch 22 and their cathodes connected to the corresponding bus 18 and bus 19. In similar manner, the opposite end of switch 23 is connected through the diodes 30 and 31 to the buses 18 and 20, respectively. The opposite end of switch 24 is connected through the diodes 32 and 33 to the buses 20 and 21, respectively. Finally, the opposite end of switch 25 is connected through a diode 34 to bus 18, a diode 35 to bus 19, and a diode 36 to bus 21.

For the purpose of actuating or closing switch 22 there is provided a high temperature alarm or fire alarm device 37. It will be understood that switch 22 is closed when a high temperature or fire, as the case may be, is detected by the alarm device 37. The device 37 may be of conventional construction. In similar manner, a low temperature alarm device 38 of conventional construction is connected to the switch 23. The switch 24 is operated by a pay television supervision and billing circuit 39, while the switch 25 is operated by a utility meter 40. The details of operation of the devices 39 and 40 will be explained below.

It should now be apparent from a consideration of FIG. 1 that when a predetermined high temperature is detected by device 37 the switch 22 will close causing both oscillator 14 and oscillator 15 to be activated applying signals with both frequencies $f_1$ and $f_2$ to the mixer amplifier 13 which applies them simultaneously and at approximately equal amplitude to the lines 11 and 12. If the low temperature alarm 38 is actuated the oscillators 14 and 16 will be activated. Likewise, if the pay television device 39 is actuated, oscillators 16 and 17 will be activated. And when the utility meter device 40 is actuated, three oscillators 14, 15 and 17 are activated. It should be understood, as symbolized by the prolongation of the buses 18, 19, 20 and 21, that additional alarm supervision devices can be incorporated in the system using other combinations of the oscillators 14 through 17. For example, an intruder alarm might be included.

Eleven different combinations of two or more frequencies can be obtained from the four oscillators. The various combinations are determined by the buses to which the switches are connected through the corresponding diodes. The diodes function to isolate each switch circuit from the next. Thus, with four oscillators up to 11 conditions can be supervised at a single subscriber location. Of course, additional oscillators could be added if required.

The pay television supervision and billing device 39 represents an arrangement for closing the switch 24 when the subscriber completes a circuit in his television receiver for receiving the pay television signals. The latter signals may be received over a separate omnibus circuit or the like. However, upon connecting the television receiver, the oscillators 16 and 17 are activated to simultaneously apply signals with the frequencies $f_3$ and $f_4$ through the mixer amplifier 13 to the lines 11 and 12 for the purpose of operating billing equipment at a central office or other remote location.

The nature of the utility meter device 40 is such that it provides for automatic billing of such service consumption as electric power, gas or water. Assume that electric power is to be billed. Let a kilowatt-hour meter be arranged to close a contact briefly for every 100 kilowatt-hours consumed and let the utility meter 40 be so arranged that following this closure it will close contact 25 and keep it closed for a period in excess of the time required by the central office to scan all the circuits. Closure of contact 25 will cause the frequencies $f_1$, $f_2$ and $f_4$ to be transmitted to the central office where the automatic billing can be handled.

Also attached to the subscriber's circuit is a readout command receiver 129. When receiving a readout command signal from the central office, this unit prepares a circuit for energizing some other alarm or reporting circuit 131 by closing the contact 130 which supplies input power to this circuit over leads 132, 133. The output of circuit 131 is connected over leads 134 to the input to the mixer amplifier 13, thus to transmit the desired information back to the central office. Circuit 131 may for example be constructed and arranged to read the water meter or to adjust the temperature at the subscriber's station in response to receipt at the central office of high or low temperature indications resulting from closure of contact 22 or 23, etc. Instead of being powered continuously by battery 27, the readout command receiver may control the application of all battery power. In the latter case switch 133*a* is actuated to contact *b*, and in the first case is actuated to contact *a*, FIG. 1.

Figure 2:
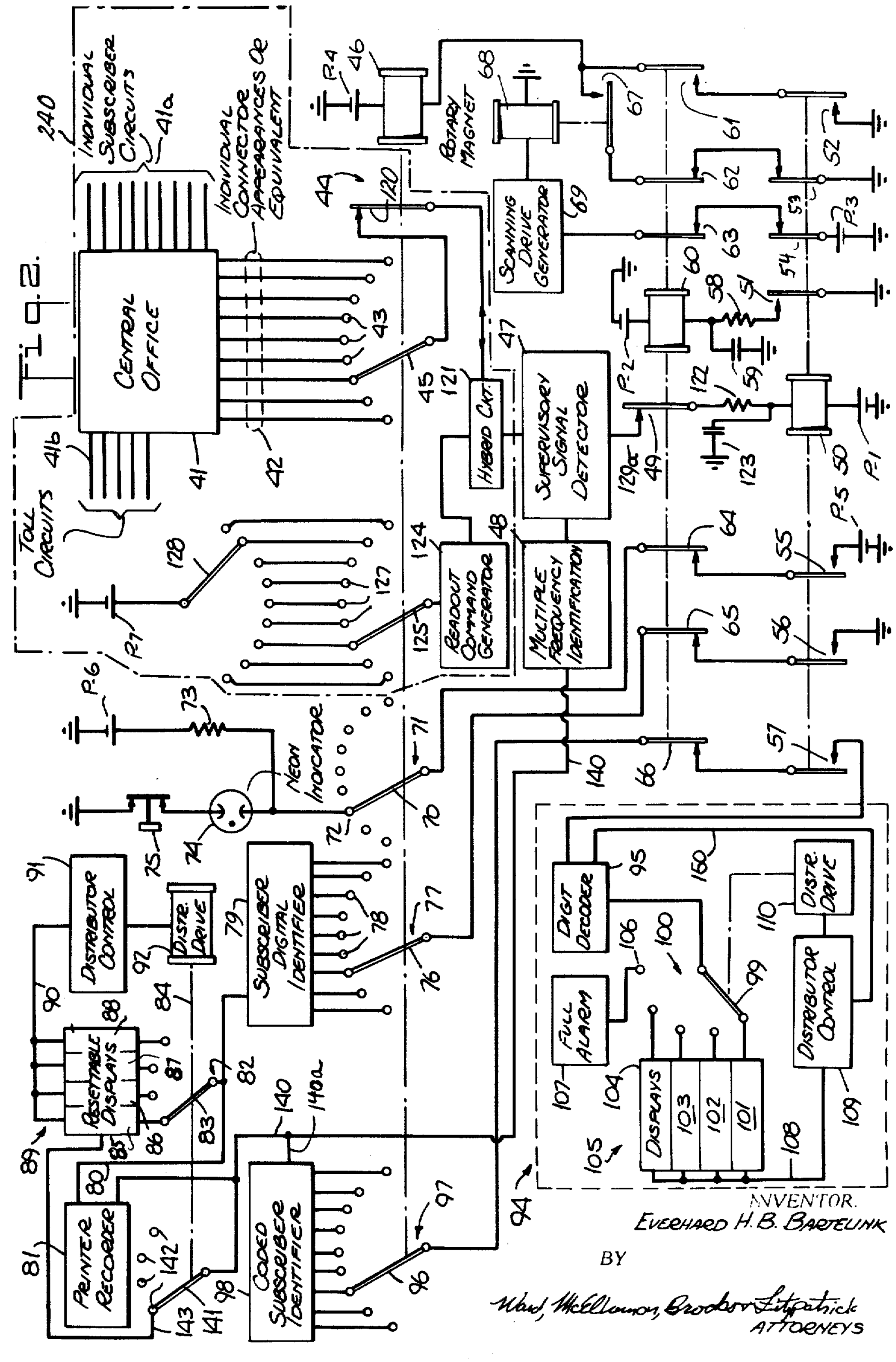
FIG. 2 is a simplified schematic diagram of an exemplary installation at the central office.

Referring now to FIG. 2, the standard central office equipment is designated generally by the numeral 41. The individual subscriber lines are shown entering the central office equipment as at 41*a* as well as a series of toll circuits as at 41*b*. In addition, a plurality of connections 42 are brought out, each from a different individual subscriber circuit, to separate contacts or steps 43 on one of the groups of contacts commonly designated as levels of a stepping switch 44 or on an equivalent scanning switch. The stepping switch 44 is equipped with rotary arms 45, 70, 76, 96 and 125. The arm 45 is a dual arm which provides connections to two groups of contacts; i.e., those for the "tip" leads and those for the "ring" leads of the subscriber circuit. For simplicity, these two arms have been schematically shown as a single arm 45 in FIG. 2. The arms of the stepping switch 44 are controlled by a stepping switch magnet 46. The arms of the stepping switch are not moved when the rotary magnet 46 is energized, however, they are moved as soon as this magnet releases.

The arms 45 of stepping switch 44 are connected to a supervisory signal detector 47 through a pair of normally closed contacts 120 of magnet 46 and thence through a hybrid circuit 121. Also connected to the hybrid circuit is a readout command signal generator 124. The hybrid circuit provides effective transmission from the subscriber circuits 42 to the supervisory signal detector 47, while greatly attenuating transmission into the readout command signal generator 124, and also provides effective transmission from the readout command signal generator 124 into the subscriber circuits 42 while greatly attenuating the transmission into the supervisory signal detector 47.

The supervisory signal detector 47 will be energized whenever a supervisory signal is found on the tip and ring leads of a subscriber's circuit which is being tested. As above described with reference to FIG. 1, such a supervisory signal is transmitted by the subscriber equipment whenever one of the alarm conditions or a routine measuring condition is present at the subscriber location. In the simple version of the system as described here, where discrete frequencies $f_1$, $f_2$, $f_3$ and $f_4$ are used, the detector 47 may consist of four conventional selective detectors. Each of these selective detectors, when operated, closes a contact to ground or energizes an equivalent circuit. The outputs of the selective detectors contacts are applied to the multiple frequency identification unit 48, FIG. 2, which upon closure of any of the switches 22–25 inclusive at a subscriber's station identifies which switch has been closed. This information may in turn be transmitted on an optional basis to operate displays or printouts through a multiconductor circuit 140 into the printer recorder 81 or through circuit 140, switch arm 141 and circuit 143 to the resettable displays 85–88, inc. In addition, this information is applied through conductor 140*a* to coded subscriber identifier 98. The supervisory signal detector 47 is so arranged that it will apply a ground to lead 129*a* whenever any of its detectors has operated. This ground, through the normally closed contact 49 of a relay 60 and a resistor 122 in series therewith, completes a circuit through the winding of a relay 50, the opposite end of which is connected to a power source P-1 to operate this relay.

A condenser 123 is connected between ground and the junction of resistor 122 and the winding of relay 50. The purpose of resistor 122 and condenser 123 is to provide a slight delay in the operation of relay 50; specifically, this delay is timed to make the operation of relay 50 slower than the release of the rotary magnet 46. Relay 50, when operated, starts a timing cycle, changes the operation of the magnet 46 controlling the stepping switch 44 and closes several circuits for the displays and printouts used in this system.

Thus, operation of relay 50 closes its normally open contact 51, thus completing a circuit from ground through contact 51, resistor 58 and the winding of relay 60 to a source of power P-2 to operate relay 60. A condenser 59 is connected between ground and the junction between resistor 58 and the winding of relay 60. The purpose of the circuit consisting of resistor 58 and condenser 59 is to generate a delay in the operation of relay 60; this delay being such as to permit the registration of the subscriber identification by the display circuits, the printer circuits or the storage circuits used in the system.

Normally, the magnet 46 of the stepping switch is actuated periodically by scanning drive generator 69, which energizes a scanning drive relay 68. The scanning drive generator is energized from a source of power P-3 through the normally closed contact 54 of relay 50 and the normally closed contact 63 of relay 60. Whenever relay 68 is operated, it completes a circuit from a source of power P-4 through the winding of the stepping switch magnet 46, the normally open contact 67 of relay 68, the normally closed contact 62 of relay 60 and the normally closed contact 53 of relay 50 to ground. Whenever relay 68 is released under control of the scanning drive generator 69, the stepping switch magnet 46 is released and the contact arms of the stepping switch 44 are advanced by one step.

Relay 50, when operated, breaks at its normally closed contacts 54, the source of power P-3 for the scanning drive generator 69 which normally operates the drive relay 68. In addition, operation of relay 50 breaks the normally closed energizing circuit for the stepping switch magnet 46 at the normally closed contact 53 of relay 50. Opening of contact 53 prevents any further operation of the stepping switch magnet 46. Futhermore, operation of relay 50 closes its normally open contact 52, thereby preparing an alternate circuit for energizing magnet 46. Operation of relay 50 also completes circuits for the display, recording, and storage circuits through its normally open contacts 57, 56 and 55.

As described above, relay 60 will operate a certain interval of time after relay 50 has operated and closed contact 51, thus energizing relay 60. Relay 60, when energized, will break the circuits to the display circuits, the recording circuits and printout circuits at its normally closed contacts 64, 65 and 66. Simultaneously, relay 60, when operated, will energize magnet 46 from the source of power P-4 through the winding of magnet 46, the normally open contact 61 of relay 60 and the normally open contact 52 of the now energized relay 50. Magnet 46 when energized does not move the arms of stepping switch 44, but it does open at its contact 120, the circuit from the subscriber circuit under test to the hybrid circuit and the supervisory signal detector 47. Opening of this circuit will cause the supervisory signal detector 47 to release, thereby removing the ground from lead 129*a*. Relay 60, when operated, also interrupts the circuit for relay 50 at its normally closed contact 49, thus causing relay 50 to release. Upon releasing, relay 50 closes its normally closed contacts 54 and 53, thereby preparing circuits for the scanning drive generator 69 and the stepping switch magnet 46. Relay 50 when released also opens the circuit for relay 60 at the normally open contact 51, and it opens the normally open contact 52 thereby releasing stepping switch magnet 46, thus causing the arms of stepping switch 44 to advance by one step. If the normally closed contacts 120 of magnet 46 should complete the circuit from the subscriber circuits 42 to the supervisory signal detector 47 before the arms of the stepping switch have moved, the delayed operation circuit for relay 50 consisting of resistor 122 and condenser 123 will prevent relay 50 from operating before the release of magnet 46 is completed and the corresponding advance of the arms of the stepping switch has taken place.

Relay 60, when released, closes its normally closed contacts 63 and 62, thereby completing the circuit for the scanning drive generator and for the rotary magnet. Thereafter, the stepping switch drive is restored to its normal condition. In this condition the stepping switch is driven through all its contacts at a speed determined by the scanning drive generator. This process continues until such time as a signal is again observed on a contact 43 associated with an individual subscriber circuit. At that point the supervisory signal detector 47 will again be energized and the process described above is resumed.

Attention will now be directed to the functions which the circuits controlled by arms 70, 76, 96 and 125 of stepping switch 44, perform during the time interval when relay 50 is operated and relay 60 is still released. During this interval, a circuit is completed from a source of battery P-5 over make contact 55 of relay 50, break contact 64 of relay 60, the arm 70 of stepping switch 44, contact 72 of the stepping switch to neon bulb 74 and the normally closed pushbutton 75 to ground. The battery potential applied through switch arm 70 is sufficient to light neon bulb 74. Another source of battery P-6 is applied to neon bulb 74 through resistor 73. This source of potential is too low to energize bulb 74, but it is sufficient to keep it energized once it has been lighted through the circuit described above. Neon bulb 74 remains lighted until it is extinguished by depressing pushbutton switch 75.

The normally open contacts 56 of relay 50 and normally closed contact 65 of relay 60 are connected in series between ground and another arm 76 of stepping switch 44 whose fixed or stepping contacts 78 are connected to corresponding channels in a subscriber digital identifier 79. The output of the identifier 79 is connected over a path 80 to a printer recorder 81 and over a path 82 to an arm 83 of a stepping switch 84. The printer records the number of the subscriber which is being tested. Through the common lead 140, the printer also records the type of alarm which at that moment has been reconstructed by the multiple frequency identification unit 48.

The contacts of the stepping switch 84 are connected respectively to successive display units 85, 86, 87 and 88 of a resettable display bank 89. A common connection 90 from the display units 85, 86, 87 and 88 is connected to a distributor control 91. A further connection or output from the distributor control couples the latter to the rotary magnet 92 of the stepping switch. The distributor control is so arranged that it will energize the distributor drive magnet 92 during the period when display data are being received and that it will advance arm 83 to the next free display unit as soon as the registration of the display data is complete. Lead 140 which carries the multiple frequency information from unit 48 is applied through another arm 141 of stepping switch 84 and through this arm to contacts 142 of this stepping switch. Lead 143 applies this information to display unit 85 thus permitting display of the type of alarm observed at the subscriber's location. Not shown are the leads which connect the other contacts 142 of switch 84 to displays 86, 87, 88, etc.

A remote display assembly shown within the dashed line box 94 includes a digit decoder unit 95 whose input is connected through normally open contacts 57 and normally closed contacts 66 to the arm 96 of another level 97 of stepping switch 44. The contacts of the stepping switch 97 are connected to individual corresponding channels in a coded subscriber identifier 98. Through multiconductor lead 140*a*, this coded subscriber identifier can be controlled to transmit additional coded information to identify the nature of the alarm, as detected by multiple frequency identification unit 48. As shown in FIG. 2, all of the armatures 45, 70, 76, 96 and 126 are coupled or ganged for operation in unison by the rotary magnet 46.

Referring to the remote display assembly 94, an output from the digit decoder 95 is coupled to an armature 99 of a stepping switch 100. All but one of the fixed contacts of the stepping switch 100 are coupled to individual display units 101, 102, 103 and 104 of a resettable display bank 105. The final or end contact 106 of the stepping switch 100 is connected to a display "full-alarm" 107. A common connection 108 is connected from all of the display units 101, 102, 103 and 104 to a distributor control 109. An output from the distributor control 109 is coupled to a rotary magnet 110 which drives the arm 99. A further connection 150 couples an output from the distributor control 109 to the digit decoder 95.

The distributor control is so arranged that it will energize the distributor drive magnet 110 during the period when display data are being received and will advance arm 99 to the next free display unit as soon as the registration of the display data is completed. During the time when the distribution switch is being driven to a new position, it prevents, through lead 150, the digit decoder 95 from transmitting any data to arm 99 of the distributor switch 100.

Under certain conditions, it is desirable that signals from the subscriber to the central office be transmitted only after a readout command signal has been transmitted from the central office to the particular subscriber. The central office provisions which permit this are shown in FIG. 2. A readout command generator 124 is provided to generate a special readout command signal which can be recognized at the subscriber location as stated earlier. By means of a multiposition switch 128, or equivalent other circuits, battery P-7 is applied to the contacts corresponding to the particular subscriber for which such a readout is desired. When the stepping switch 44 reaches the position corresponding to this subscriber, the readout command generator 124 is energized and the readout command is transmitted through the hybrid 121, the normally closed contact 120 of rotary magnet 126 and the arm 45 of the stepping switch to the individual subscriber circuit.

Recapitulation of the overall operation of the system is as follows: So long as no alarm conditions exist, the stepping switch 44 is being driven at a rapid rate by the scanning drive general 69. The scanning rate of the system may, for instance, be 100 circuits per minute. This permits supervising a group of 1000 circuits every 10 minutes and allows approximately 600 ms per circuit for detection of alarm signals. Considerably higher scanning rates may be used with proper equipment design.

As soon as an alarm or reporting condition is observed, the scanning drive generator is disconnected and a timing cycle determined by the requirements of the printing device, display device or the recording device is initiated. Upon completion of the information transfer to the printing, display or recording device, control of the scanning is returned to the scanning drive generator, thus returning the system to its normal mode of operation.

It was noted above that a possible scanning rate is once every 10 minutes for 1,000 circuits. Therefore, in order to read the utility meter 40 of FIG. 1, it is necessary that an output signal therefrom prevail for at least 10 minutes. This is accomplished by incorporating either within the utility meter 40 or in associated equipment, a latching circuit to maintain switch 25 closed for, say, 15 minutes. This represents a period in excess of one and less than two times the duration of one scanning cycle. If signals are observed on two consecutive scane at the central office station, they will be counted as one signal which will be supplied to recording and billing equipment for the electric service. It is assumed that the maximum consumption of power is such that at least 20 minutes will elapse between two successive bona fide signals from the meter.

For purposes of explanation, four different types of printing, displaying or recording arrangements have been shown in FIG. 2. If the organization which operates the central office is providing the manpower for recognizing the presence of an incoming alarm and for instituting the required action in response to it, there is no need for the remote equipment 94. However, if the response, for example to a fire alarm, is to be handled by an outside agency, such agency would be provided with the display and identifying equipment 94. In addition, by circuits within unit 98, the identification provided by the multiple frequency identification unit 48 would also be communicated to the remote agency. The same could be true of intruder alarms and the like; thus, any one, two, three or all of the subscriber identifying circuits can be employed.

The circuit described above with reference to FIG. 1 employs a plurality of oscillators energized in different combinations and powered by a local battery. Considerable simplification of the equipment at the subscriber location can be achieved by supplying the power for the local generators from the central office and by using generators of the type described in the copending application of John T. Boatwright and Donald L. Knight, Ser. No. 844,965 filed July 29, 1969 and entitled "Method and Apparatus for Testing a Communication Line."

Figures 3, 4:
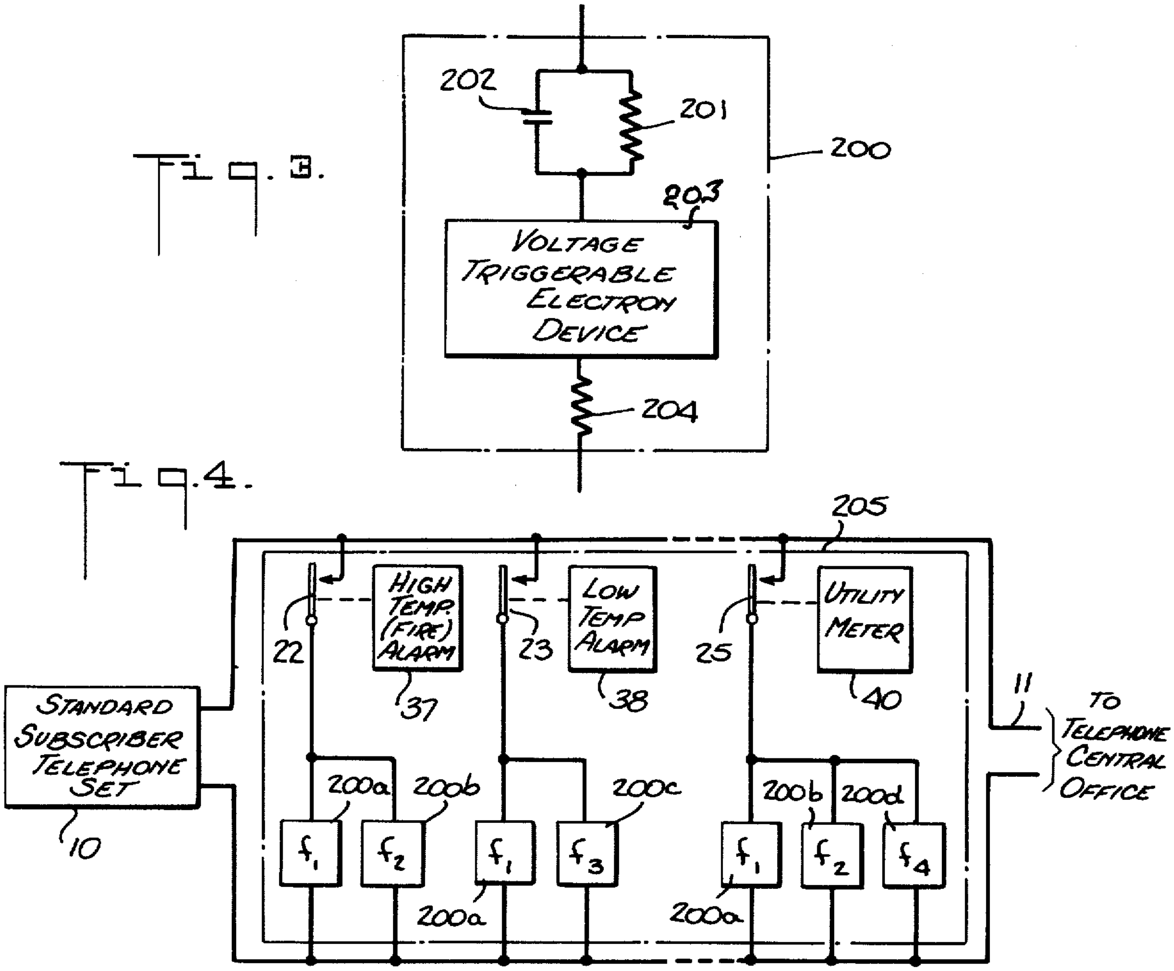
FIG. 3 is a schematic diagram of a voltage triggerable generator of supervisory signals as used in various modifications of the circuit of FIG. 1.
FIG. 4 is a schematic diagram showing one modification of the circuit of FIG. 1 employing the generator of FIG. 3.

In FIG. 3 of the present application, there is shown a supervisory signal generator 200 of the type described and claimed in the aforesaid Boatwright and Knight application. The generator 200 includes a time constant circuit consisting of a resistor 201 connected in parallel with a capacitor 202. The time constant circuit is connected in series with a voltage triggerable electron device 203 and a current limiting resistor 204. As described in the aforesaid Boatwright and Knight application the voltage triggerable electron device 203 may take the form of a neon tube or other device having a similar voltage/current characteristic.

When the generator 200 of FIG. 3 is connected across the lines interconnecting a standard subscriber telephone set with the central office such generator is quiescent until a D.C. voltage is applied to the lines sufficient to trigger the electron device 203. Upon this occurring the electron device in cooperation with the time constant circuit oscillates to apply an A.C. signal to the lines. By selecting the values for resistor 201 and capacitor 202 it is possible to control the mean frequency of the generator 200. It will be understood, however, that the frequency of operation of this type generator is voltage sensitive and will vary within limits if the applied voltage should vary.

Referring now to FIG. 4, there is shown a subscriber circuit which is substantially equivalent to the circuit of FIG. 1 but greatly simplified in view of the use of the generator of FIG. 3. In FIG. 4 each of the generators **200*a***, 200*b*, 200*c* and **200*d*** is tuned to oscillate at a different frequency.

In the arrangement of FIG. 1, the oscillators 14, 15, 16 and 17 were energized directly upon closure of the associated condition responsive switch 22, 23, 24 or 25. On the other hand, the alarm or reporting circuit 131 was energized only upon the simultaneous occurrence of the condition to be reported upon and the transmission of a readout command from the central office. In the system of FIG. 4 all of the control circuits are responsive to a command from the central office. Thus, if a fire occurs energizing the alarm 37 so as to close switch 22 it merely serves to condition the generators **200*a*, and 200*b* to be activated. In effect, the function of the readout command receiver 129 in FIG. 1 is inherently incorporated in each of the generators 200. Typical equipment for energizing the generators 200 will be described below. For convenience, the equipment within the broken line box 205** may be considered a responder unit.

Figure 5:
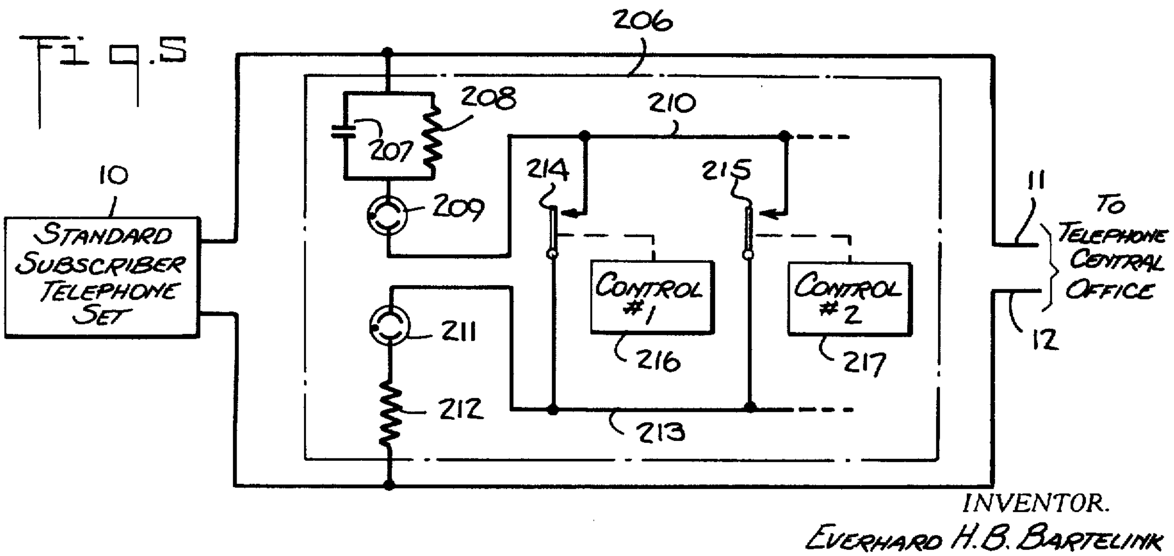
FIG. 5 is a schematic diagram of another embodiment of the subscriber circuit wherein a single frequency tone generator is employed.

A further modification of the subscriber circuit is shown in FIG. 5 to which attention is now directed. As seen herein, the responder circuit 206 includes a capacitor 207, resistor 208 and neon tube 209 connected, as shown, between a bus 210 and the line 11 of the subscriber circuit. Another neon tube 211 is connected in series with a resistor 212 between a second bus 213 and the second line 12 of the subscriber circuit. Connected in parallel across the buses 210 and 213 are a number of condition controlled switches, for example, switches 214 and 215, under the control of condition responsive devices 216 and 217, respectively. As many additional condition responsive devices as desired may be connected between the buses 210 and 213.

It should now be apparent that upon closure of any of the switches interconnecting the buses 210 and 213 a circuit will be completed across the subscriber lines 11 and 12 through the neon tubes 209 and 211 and the associated time constant circuit and current limiting resistor. When appropriate D.C. voltage is applied to the lines 11 and 12 from the central office the tubes 209 and 211 will break down and commence oscillating. The purpose of the two tubes 209 and 211 is to isolate both buses 210 and 213 from the subscriber lines for reasons of safety in the absence of a "command" signal. This represents a design consideration and one tube may be used if desired.

Figure 6:
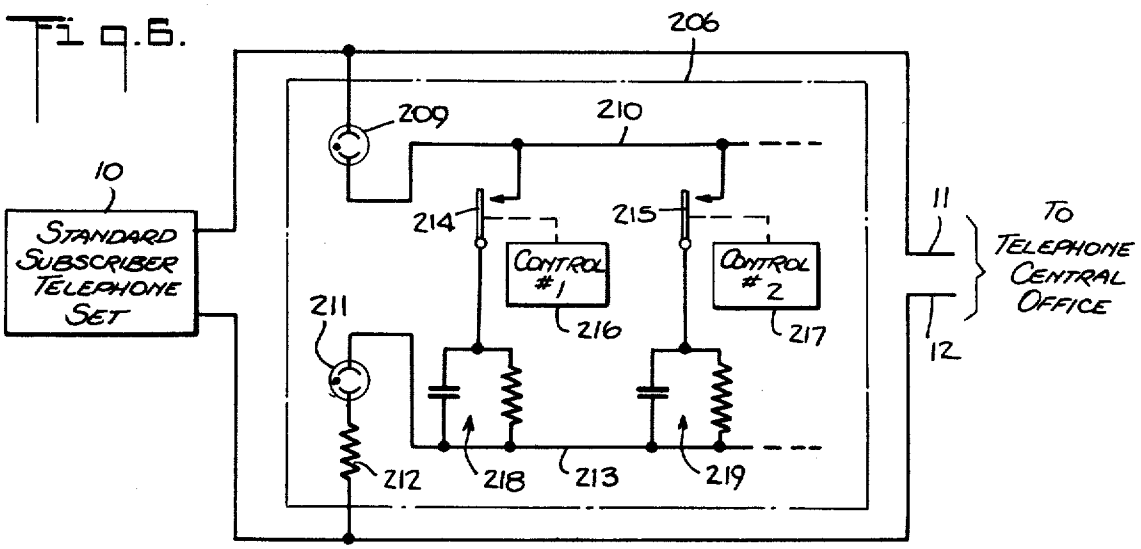
FIG. 6 is a schematic diagram of a modification of the circuit of FIG. 5 wherein a single oscillator is arranged to generate tone signals of different frequencies.

In FIG. 6, there is shown a modification of the circuit of FIG. 5 whereby the generator will be caused to oscillate at different frequencies depending upon the condition activating same. Thus, while FIG. 5 employs one time constant circuit, FIG. 6 employs a plurality of time constant circuits 218 and 219 each having a different time constant. In all other respects, the circuit may be similar to that of FIG. 5. However, it will be understood that since a different time constant circuit is connected in series with the neon tubes they will oscillate at a different frequency.

Figure 7:
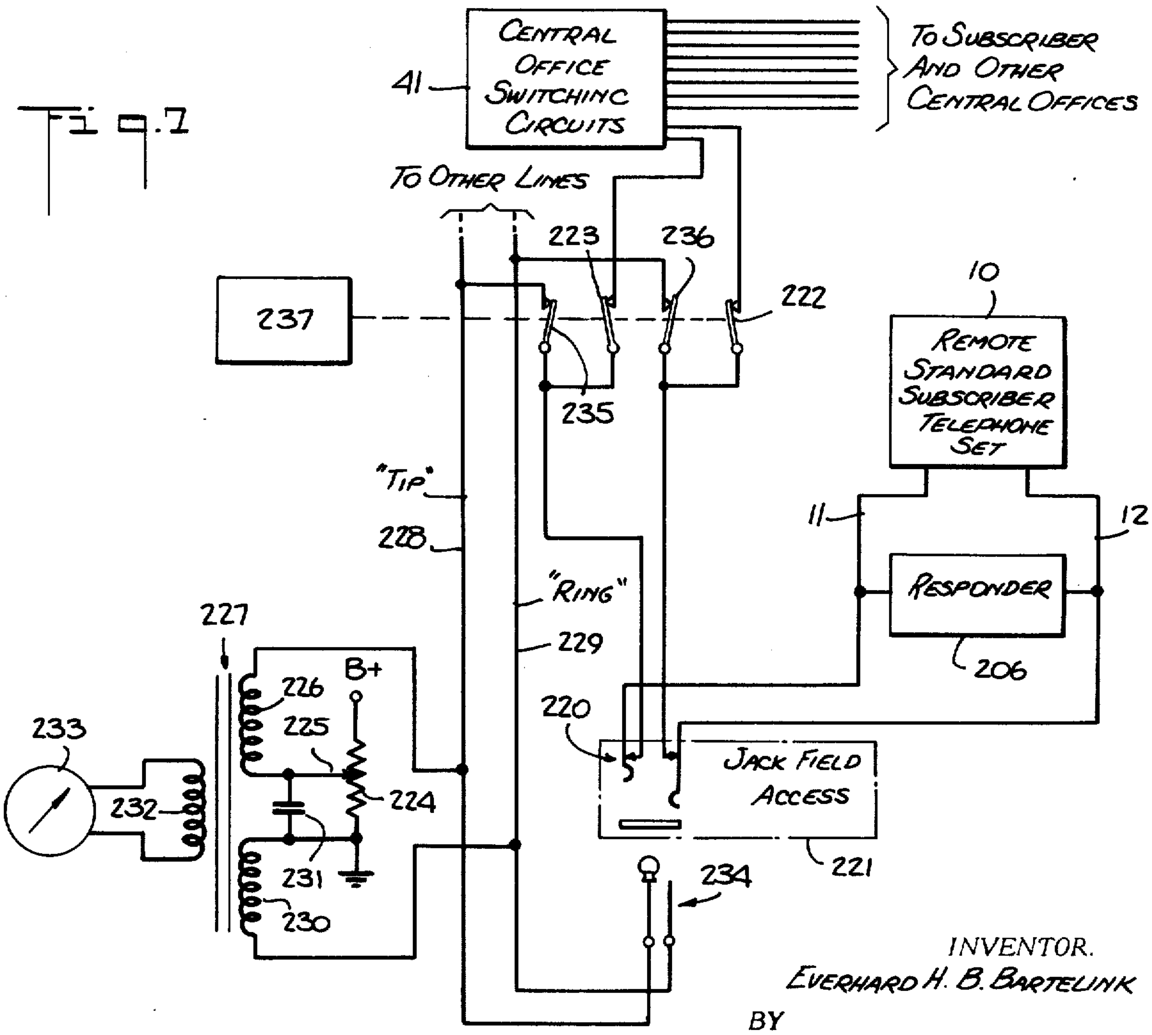
FIG. 7 is a schematic diagram illustrating a simplified central office system for supervisory remote subscriber circuits provided with any of the supervisory circuits of FIGS. 4, 5, or 6.

There is shown in FIG. 7 in simplified form the basic components necessary for applying the command signal to a subscriber line to energize the responder equipment shown in either of FIGS. 5 and 6, and detecting, in response, the presence of an A.C. signal on line. In principle, the circuit of FIG. 7 can also be employed to energize the circuit of FIG. 4; however, additional equipment will be required such as to be described hereinafter for identifying the different frequency signals which the circuit of FIG. 4 applies to the line.

For the purpose of illustration, there is shown in FIG. 7 two ways of gaining access to the subscriber circuit. One way is manually operable while the other is operable under the control of relays.

As seen in FIG. 7, a responder 206 is connected across the subscriber lines 11 and 12 which, in turn, are coupled through the normally closed contacts of a jack 220 in the jack field access 221 and the normally closed relay contacts 222 and 223 to the central office switching circuits 41. For testing purposes, there is provided a potentiometer 224 connected between a source of positive voltage and ground. The slider 225 of the potentiometer 224 is connected through one winding 226 of a transformer 227 to a "tip" line 228. A "ring" line 229 is connected through a second winding 230 of the transformer 227 to ground. An A.C. bypass capacitor 231 is connected between ground and the slider 225.

An output winding 232 of the transformer 227 is connected to a level meter 233. On the one hand, the "tip" and "ring" lines 228 and 229 are connected to a plug 234 while on the other hand they are connected through normally open relay contacts 235 and 236 to the subscriber lines 11 and 12, respectively. The relay contacts 222, 223, 235 and 236 are controlled by a relay 237.

When it is desired to test the subscriber circuit, either the plug 234 is inserted in the appropriate jack, or the relay 237 associated with the particular subscriber line is energized to disconnect the subscriber line from the central office switching circuits and connect it to the "tip" and "ring" lines 228 and 229. When this is accomplished the voltage applied to the circuit by the test unit can be progressively increased by adjusting the slider 225 on potentiometer 224 until the desired response has been obtained from the responder 206. If none of the condition responsive devices at the subscriber location are activated, there will be no response from the responder. However, if any of the devices at the remote location are activated a signal will be detected by the meter 233. Circuits for providing automatic frequency control and phase control of the responder signals can be provided in a manner that will be evident from the teaching of the aforesaid Boatwright and Knight application.

Figure 8:
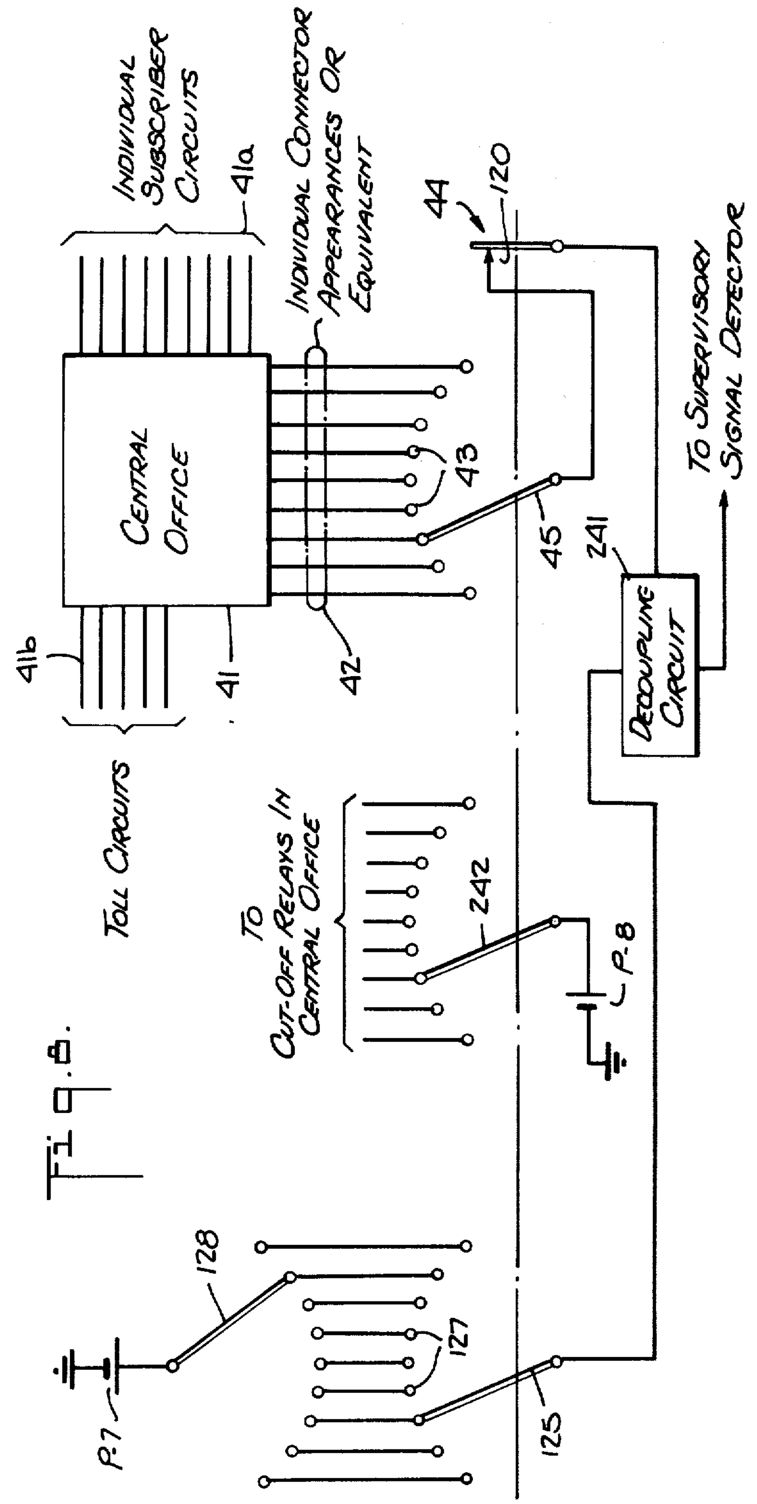
FIG. 8 is a fragmentary schematic diagram showing a modification of the central office equipment of FIG. 2.

In order to provide complete supervision, the central office equipment shown in FIG. 2 may be modified by replacing that portion shown within the broken line box 240 with the equipment shown in FIG. 8. As seen therein, the switch arm 125 is now connected directly through a decoupling circuit 241 to the contacts 120. In addition, the multi-arm switch 44 may contain additional arms such as the arm 242 for applying voltage from a battery P-8 to energize the usual cut-off relays in the central office equipment. In the commonly used circuits, operation of the cut-off relay removes all other sources of voltage from the line. It should be understood that the voltage of power source P-7 is sufficiently high to exceed the threshold of operation of the remote generating devices located at the subscriber's location. The purpose of the decoupling circuit 241 is to prevent the D.C. voltage from switch arm 125 being fed into the supervisory signal detector 47. It will also be understood that the modification of FIG. 8 will enable the circuit of FIG. 2 to function with responder devices of the type shown in FIG. 4. Further explanation of the operation of FIG. 8 is deemed unnecessary.

Figure 9:
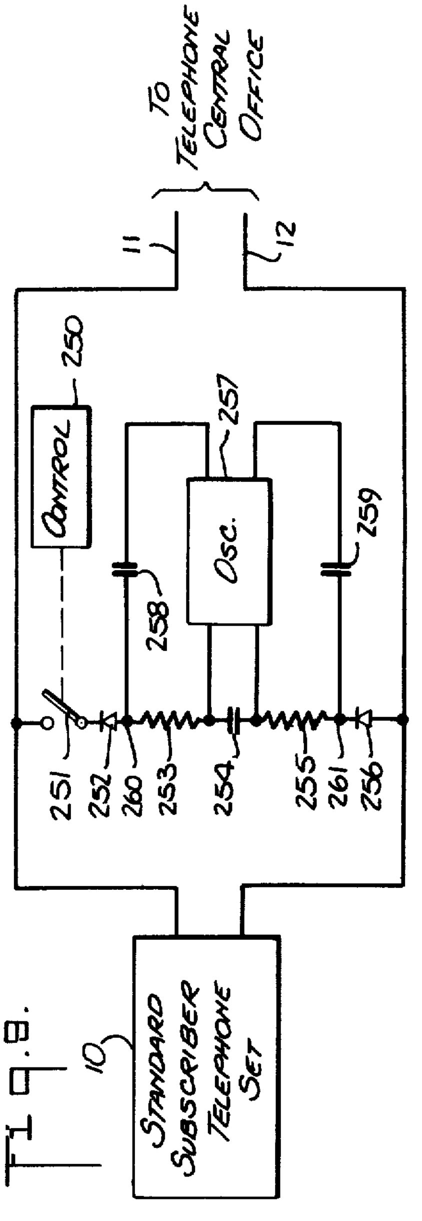
FIG. 9 is a schematic diagram of a still further embodiment of the supervisory equipment locatable at the subscriber station.

A somewhat different responder arrangement is illustrated in FIG. 9 to which attention is now directed. As seen therein, a control device 250 is provided for actuating a normally open switch 251. The switch 251 has one terminal connected to the subscriber line 11. The other terminal of the switch 251 is connected to the subscriber line 12 through a network consisting of a diode 252, a resistor 253, a capacitor 254, another resistor 255, and a diode 256, all in series. An oscillator 257 has an input connected across the capacitor 254 for receiving energizing power and has a signal output connected through capacitors 258 and 259 to the junctions 260 and 261 in the series network. The oscillator 257 is arranged such that when D.C. voltage is applied through the diodes 256 and 252 such that the junction 261 is positive with respect to the junction 260 oscillation will commence. Upon the initiation of oscillation an A.C. signal will be fed by the oscillator 257 through the condensers 258 and 259 and the diodes 252 and 256 to the lines 11 and 12.

It should now be apparent that so long as the line 11 is maintained positive with respect to the line 12, the oscillator 257 will remain quiescent. However, if the polarity is reversed on the lines 11 and 12, the oscillator 257 will be energized, assuming that control 250 has closed switch 251.

It will be understood that the system of FIG. 9 can be used with manually operated telephone systems or the like wherein D.C. voltage of only one polarity is normally applied to the lines. However, in those systems where D.C. voltage of both polarities are usually applied to the subscriber line it will be necessary to employ the responder circuit of either FIGS. 1, 4, 5 or 6.

Having described the invention with reference to certain presently preferred embodiments thereof, it should be apparent that numerous changes may be made in the construction thereof without departing from the true spirit of the invention.

What is claimed is:

1. An alarm signaling and supervisory monitoring apparatus for telephone subscriber homes, residences and the like, comprising in combination: a telephone central office, a plurality of residential telephone subscribers' stations, each station having thereat, a subscriber's telephone set connected to said central office over a circuit consisting of a pair of metal conductors, a normally inactive oscillation generator adapted to generate a distinctive tone frequency signal within the transmission frequency band of said station, high impedance means coupling an output from said oscillation generator to said telephone circuit, a device separate and apart from said telephone set which responds to a preselected change in a condition at said station subject to variation, for activating said oscillation generator to transmit said tone signal over said circuit to said central office, monitoring means at said central office for repetitively scanning said plurality of said subscriber's circuits, said monitoring means responding to receipt of said tone signal over any said subscriber's circuit for identifying and indicating the said circuit over which said tone is received.

2. The combination according to claim 1, which additionally includes means at said central office for selectively transmitting a distinctive signal to any selected subscriber's station, means connected to said subscriber's circuit thereat responsive to said signal for energizing a reporting circuit coupled to said subscriber's circuit, and means in said reporting circuit when energized for transmitting signals over said subscriber's circuit to the central office reporting upon a condition at said subscriber's station.

3. The combination according to claim 1 wherein said scanning means includes a scanning switch and a scanning pulse generator periodically activating said switch for successively connecting said subscriber circuits to a signal-detecting means, said detecting means including means responsive to said supervisory signal for deactivating said pulse generator to arrest said scanning progression, means responsive to the positioning of said scanning switch for identifying the subscriber circuit over which said supervisory signal is received and for indicating the changed condition at said subscriber's station.

4. The combination according to claim 1, wherein said electrical supervisory signal comprises the combination of at least two frequencies within the transmission frequency band of said subscriber's circuit.

5. The combination according to claim 1, wherein said signal-generating means comprises a D.C. voltage energizable oscillator.

6. The combination according to claim 5, which additionally includes means at said central office for selectively transmitting a D.C. voltage to any selected subscriber's station for energizing any said oscillator connected to the subscriber's circuit thereat, said oscillator when energized transmitting an oscillatory signal over said subscriber's circuit to the central office reporting upon a change in a condition at said subscriber's station.

7. The combination according to claim 6, wherein said oscillator is voltage triggerable and said D.C. voltage is in excess of any voltage normally on the subscriber's circuit.

8. The combination according to claim 6, wherein said oscillator is energizable by D.C. voltage of only a given polarity, and said selectively-transmitted D.C. voltage is of said given polarity.

9. The combination according to claim 1 which includes at each subscriber's station, a plurality of normally inactive oscillation generators, each having an output coupled through high impedance means to said subscriber's telephone circuit and each adapted to generate a distinctively different tone frequency signal within the transmission frequency band of said station, a corresponding plurality of devices at said station associated with said generators respectively, each device being separate and distinct from said subscriber's set, and each adapted to respond to a preselected change in a condition at said station subject to variation, a different condition for each said device, and for activating the associated tone generator to transmit its tone signal over said subscriber's circuit to said central office, said repetitively monitoring means at said central office responding to any said tone signal received from any said tone signal received from any said station to identify the station from which said signal is received, and means at said central office selectively responsive to said different tone signals for uniquely identifying the condition of change at said station.

10. The combination according to claim 9, wherein each of said plurality of distinctively different electrical supervisory signals comprises a different combination of at least two frequencies within the transmission frequency band of said subscriber's circuit.

11. The combination according to claim 9, wherein said electrical supervisory signal-generating means comprises a series of oscillators, each generating a single frequency different from all of the others, and wherein each of said distinctively different electrical supervisory signals comprises a different combination of at least two of said oscillator frequencies.

12. The combination according to claim 9, wherein said scanning means includes a series of contacts to which said subscriber circuits are respectively connected and means for successively connecting a signal detector to said contacts in successive sequence, means controlled by said signal detector for arresting said scanning in response to receipt by said signal detector of a supervisory signal from a subscriber's circuit, a signal identification circuit connected to said signal detector for selectively identifying each of said distinctively different supervisory signals, and means responsive to said identification circuit for selectively and uniquely indicating each of said distinctive supervisory signals as and when received over any of said subscriber's circuits.

13. The combination according to claim 12, wherein said scanning means comprises a second series of contacts connected to a decoding device, and wherein said means for successively connecting to said signal detector the series of contacts respectively connected to said subscriber's circuits also concurrently successively connects an energizing circuit to said second series of contacts, whereby upon arresting said scanning on any particular contact connected to a subscriber's circuit, said energizing circuit is connected to a corresponding contact of said second series for identification by said decoder of the subscriber's circuit at which said scanning is arrested.

14. In a telephone system comprising a central office having connected thereto over circuits individual thereto a plurality of subscriber's telephone stations, each located within premises provided with facilities subject to abnormal variations including at least one of the group consisting of heat, power and water, the method of repetitively monitoring from said central office a condition of said premises subject to abnormal variation, said method comprising: sensing at said station the occurrence of a preselected variation of said condition from a preselected value thereof; generating at said station in response to said variation, a distinctive tone frequency signal within the transmission frequency band of said station; transmitting said signal over said subscriber's circuit to said central office, while repetitively scanning said plurality of circuits at said central office, and upon receipit of said tone signal over any said subscriber's circuit, idenetifying the circuit over which said tone signal is received; and indicating the said variation in said condition occurring at said subscriber's station.

15. The method according to claim 14, wherein said supervision is applied to a plurality of conditions subject to change at each subscriber's station by generating at each said station a corresponding plurality of mutually distinctive electrical supervisory signals and selectively applying said mutually distinctive signals to each subscriber's telephone circuit in accordance with preselected changes in said conditions, respectively, and at said central office selectively discriminating between the mutually distinctive supervisory signals received and causing them to produce distinctively different indications at said central office.

16. The method according to claim 15, wherein each of said supervisory signals comprises the combination of at least two different frequencies and a different combination of each frequency for each of said distinctively different supervisory signals.

17. In a telephone system in combination: a central office having a plurality of subscriber stations connected thereto over tip and ring individual to said stations and supevisory apparatus for repetitively monitoring from said central office a condition subject to change at each said station, said apparatus including at each said station, means coupled between the tip and ring leads for generating and applying to said leads a distinctive alternating current supervisory signal when activated, and means responsive to a preselected change of said condition for activating said signal-generating means, said apparatus including at said central office, means for repetitively scanning said subscriber's leads, said scanning means including a scanning switch and a scanning pulse generator periodically activating said switch for successively connecting said subscriber leads to a signal-detecting means, said detecting means responding to receipt of said supervisory signal to activate a first relay, the activation of which deactivates said pulse drive generator to arrest said scanning, and also completes an energizing delay circuit for activating a second relay, said second relay upon delayed energization deactivating said first relay, the deactivation of which in turn deactivates said second relay to restore said scanning sequence, means responsive to receipt of any said supervisory signal over said leads for automatically identifying the subscriber's station from which said supervisory signal is received, and means for identifying said changed condition from a plurality of possible conditions.

18. The combination according to claim 17, wherein the positioning of said scanning switch upon arrest of said scanning identifies the leads over which said supervisory signal is received, and wherein said central office apparatus includes means responsive to activation of said first relay, and circuits, including release contacts of said second relay and contacts of said stepping switch, for indicating the lead on which said supervisory signal is received, and also for activating indicating means responsive to said signal.

* * * * *